(12) United States Patent
Ning et al.

(10) Patent No.: US 9,507,941 B2
(45) Date of Patent: Nov. 29, 2016

(54) METHOD OF VERIFYING INTEGRITY OF ELECTRONIC DEVICE, STORAGE MEDIUM, AND ELECTRONIC DEVICE

(71) Applicant: Samsung Electronics Co., Ltd., Gyeonggi-do (KR)

(72) Inventors: Peng Ning, Cupertino, CA (US); Moo-Young Kim, Seoul (KR); Min-Jung Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 59 days.

(21) Appl. No.: 14/536,940

(22) Filed: Nov. 10, 2014

(65) Prior Publication Data

US 2015/0150127 A1    May 28, 2015

(30) Foreign Application Priority Data

Nov. 22, 2013 (KR) .................. 10-2013-0143323

(51) Int. Cl.
*G06F 11/00* (2006.01)
*G06F 21/57* (2013.01)

(52) U.S. Cl.
CPC ..................... *G06F 21/57* (2013.01)

(58) Field of Classification Search
CPC ....................................................... G06F 21/57
USPC ............ 726/22, 15, 30; 718/1; 713/165, 188
See application file for complete search history.

(56) References Cited

U.S. PATENT DOCUMENTS

| | | | | |
|---|---|---|---|---|
| 5,815,647 A * | 9/1998 | Buckland | ............ | G06F 11/0745 710/104 |
| 5,915,124 A * | 6/1999 | Morris, III | .......... | G06F 12/0292 710/9 |
| 6,199,181 B1 * | 3/2001 | Rechef | .................... | G06F 21/53 714/38.13 |
| 6,898,643 B2 * | 5/2005 | Joyeau | .................... | G06F 13/10 710/15 |
| 7,657,419 B2 * | 2/2010 | van der Made | .... | G06F 9/45537 703/22 |
| 8,347,072 B2 * | 1/2013 | Mittal | ................. | G06F 12/1441 713/187 |
| 8,850,212 B2 * | 9/2014 | Proudler | ................. | G06F 21/57 713/151 |
| 9,361,462 B2 * | 6/2016 | Chen | ....................... | G06F 21/57 |
| 2002/0029311 A1 * | 3/2002 | Joyeau | .................... | G06F 13/10 710/310 |
| 2003/0037237 A1 * | 2/2003 | Abgrall | .................... | G06F 21/53 713/166 |
| 2005/0114616 A1 | 5/2005 | Tune et al. | | |
| 2008/0244572 A1 * | 10/2008 | Sahita | ................. | G06F 9/45533 718/1 |
| 2009/0327711 A1 * | 12/2009 | Goldsmid | ............... | G06F 21/53 713/165 |
| 2010/0031360 A1 | 2/2010 | Seshadri et al. | | |
| 2010/0115625 A1 * | 5/2010 | Proudler | ............... | G06F 21/445 726/27 |
| 2010/0161998 A1 * | 6/2010 | Chen | ....................... | G06F 21/57 713/189 |
| 2013/0061056 A1 * | 3/2013 | Proudler | ................. | G06F 21/57 713/176 |
| 2015/0052519 A1 * | 2/2015 | Yu | ....................... | G06F 9/45541 718/1 |
| 2015/0082304 A1 * | 3/2015 | Hepkin | ................. | G06F 21/53 718/1 |
| 2015/0199507 A1 * | 7/2015 | Azab | ....................... | G06F 21/53 726/22 |
| 2015/0200934 A1 * | 7/2015 | Naguib | ................. | G06F 21/57 713/2 |
| 2015/0318986 A1 * | 11/2015 | Novak | ................. | H04L 9/3247 713/189 |
| 2016/0078226 A1 * | 3/2016 | Dalton | ................. | G06F 21/55 726/23 |

* cited by examiner

*Primary Examiner* — Amare F Tabor
(74) *Attorney, Agent, or Firm* — Cha & Reiter, LLC

(57) ABSTRACT

Disclosed herein are techniques for verifying the integrity of an electronic device. A normal world virtual processor and a secure world virtual processor are instantiated. An integrity verification agent is executed by the secure world virtual processor. A kernel operation attempted by the normal world virtual processor is intercepted by the secure world virtual processor.

17 Claims, 12 Drawing Sheets

| 15 14 13 12 | 11 10 9 | 8 | 7 6 5 | 4 | 3 2 1 0 |
|---|---|---|---|---|---|
| 1 1 1 0 | 1 1 1 | 0 | opc 1 | 0 | CRn |

| 15 14 13 12 | 11 10 9 8 | 7 6 5 | 4 | 3 2 1 0 |
|---|---|---|---|---|
| Rt | coproc | opc 2 | 1 | CRm |

| 31 30 29 28 | 27 26 25 24 | 23 22 21 20 | 19 18 17 16 | 15 14 13 12 | 11 10 9 8 | 7 6 5 | 4 | 3 2 1 0 |
|---|---|---|---|---|---|---|---|---|
| cond | 1 1 1 0 | opc 1 | 0 | CRn | Rt | coproc | opc 2 | 1 | CRm |

FIG.3

METHOD OF VERIFYING INTEGRITY OF ELECTRONIC DEVICE, STORAGE MEDIUM, AND ELECTRONIC DEVICE

CLAIM OF PRIORITY

This application claims priority under 35 U.S.C. §119(a) to Korean Application Serial No. 10-2013-0143323, which was filed in the Korean Intellectual Property Office on Nov. 22, 2013, the entire content of which is hereby incorporated by reference.

TECHNICAL FIELD

The present disclosure relates to software system security of an electronic device.

BACKGROUND

Due to damage and loss caused by attacks and security breaches, a lot of attention has been paid to the development of security and confidence systems for computer platforms, including mobile and embedded systems.

Computer attacks and security breaches may have a serious effect on target devices by performing unauthorized modifications of critical programs. Such critical programs may include user processes or system management daemons executed within a target system or an Operating System (OS) kernel. In particular, the modification of the OS kernel may allow malignant attackers to gain unlimited access to the entire system.

Although such problems have been isolated from the executing OS, it is necessary to ensure integrity by developing unconventional solutions capable of actively monitoring the target system, including the kernel, and providing required memory protection.

SUMMARY

The present disclosure at least partially addresses, alleviates, or removes some of the problems and/or disadvantages of conventional integrity systems.

Aspects of the present disclosure may actively monitor a target system, including a kernel thereof, to provide memory protection and ensure the system's integrity.

In accordance with one aspect of the present disclosure, a method of verifying the integrity of an electronic device is provided. In one example, the method may include: instantiating a normal world virtual processor and a secure world virtual processor for the electronic device; executing an integrity verification agent within a domain of the secure world virtual processor; intercepting, by the secure world virtual processor, an operation attempted by the normal world virtual processor in which the operation is associated with a kernel module; and detecting, by the integrity verification agent, an execution result of the intercepted operation.

In accordance with another aspect of the present disclosure, an electronic device for performing integrity verification is provided. In a further example, the electronic device may include: a secure world virtual processor to: execute an integrity verification agent; intercept an operation attempted by the normal world virtual processor in which the operation is associated with a kernel module; and detect, using the integrity verification agent, an execution result of the intercepted operation.

The present disclosure for active monitoring, memory protection, and integrity verification of target devices may be implemented with hardware, software, firmware, or a combination thereof. Thus, the terms "function" or "module" used herein refer to hardware, software, and/or firmware for implementing mentioned features. In one example, the present disclosure may be implemented by using a non-transitory computer readable medium storing computer executable instructions that cause at least one processor of a computer to perform the techniques of the present disclosure. An example non-transitory computer readable medium suitable for implementing the present disclosure may include a non-temporary computer-readable medium, for example, a disk memory device, a chip memory device, a programmable logic device, and/or an application specific integrated circuit. Furthermore, the non-transitory computer readable medium for implementing the present disclosure may be located in a single device or computing platform or may be dispersed over a plurality of devices or computing platforms.

As described above, a target system and its kernel may be actively monitored so as to provide memory protection and to ensure its integrity.

BRIEF DESCRIPTION OF THE DRAWINGS

The above and other aspects, features, and advantages of the present disclosure will be more apparent from the following detailed description taken in conjunction with the accompanying drawings, in which:

FIG. 3 illustrates a working example of encoding MCR instructions used in writing to CP registers in accordance with aspects of the present disclosure;

DETAILED DESCRIPTION

Figure 1:
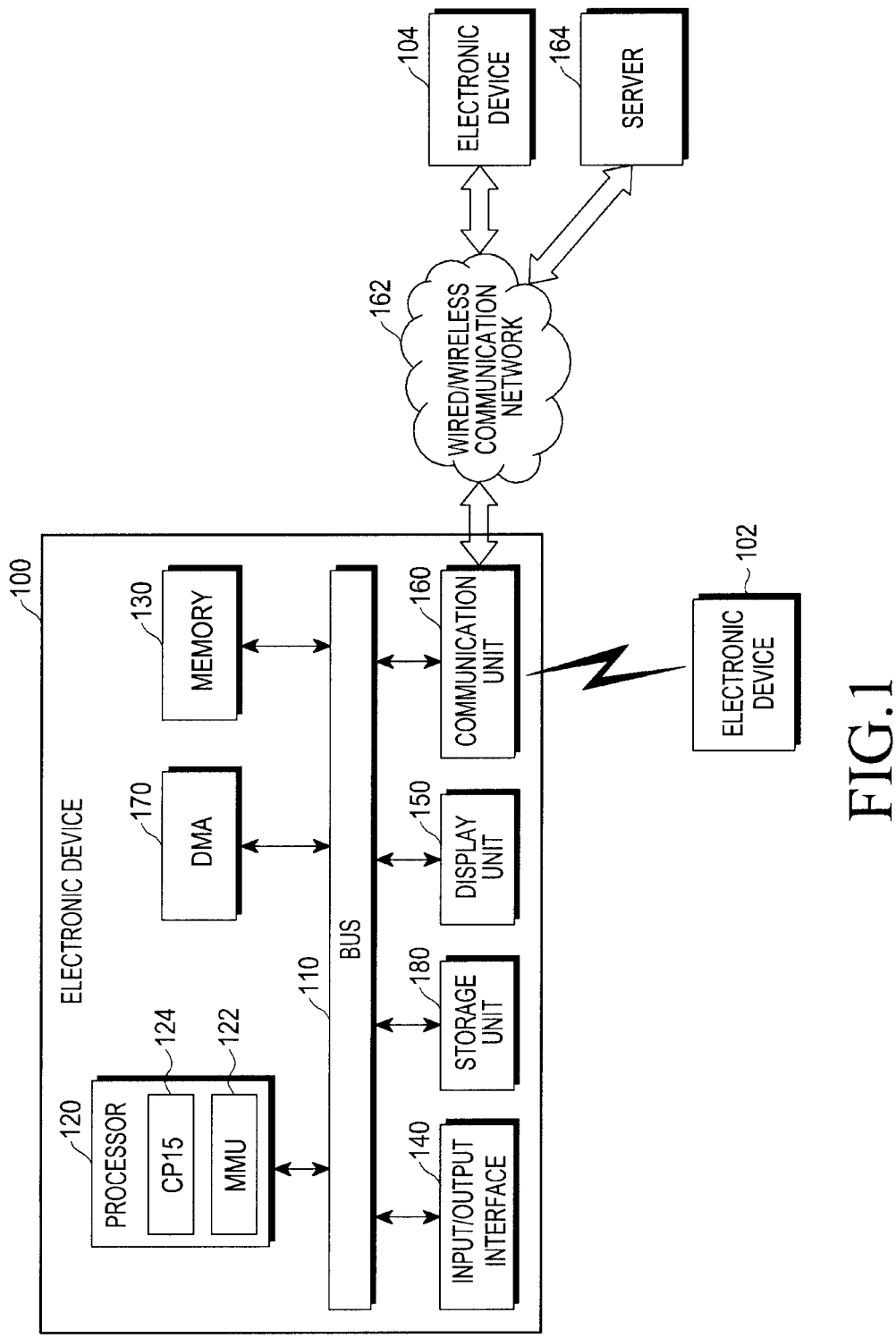
FIG. 1 is a block diagram illustrating an example electronic device in accordance with aspects of the present disclosure.

The present disclosure may have various modifications and various example implementations. Specific examples will now be described more fully with reference to the accompanying drawings. However, it should be understood that there is no intent to limit the present disclosure to the specific examples, but on the contrary, the present disclosure covers all modifications, equivalents, and alternatives falling within the spirit and scope of the disclosure.

Terms including ordinal numerals such as "first", "second", and the like can be used to describe various structural elements, but the structural elements are not limited by these terms. The terms are used only to distinguish one structural element from another structural element. For example, without departing from the scope of the present disclosure, a first structural element may be named a second structural element. Similarly, the second structural element also may be named the first structural element. The terms "and/or" include combinations of a plurality of related items or a certain item among the plurality of related items.

The terms used in this application are for the purpose of describing particular examples only and are not intended to limit the disclosure. As used herein, the singular forms are intended to include the plural forms as well, unless the context clearly indicates otherwise. In the description, it should be understood that the terms "include" or "have" indicate existences of a feature, a number, a step, an operation, a structural element, parts, or a combination thereof, and do not previously exclude the existences or probability of adding one or more other features, numeral, steps, operations, structural elements, parts, or combinations thereof.

Unless defined differently, all terms used herein, which include technical terminologies or scientific terminologies, have the same meaning as a person skilled in the art would comprehend. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device may be a device including a communication function. For example, the electronic device may include at least one of a smart phone, a tablet Personal Computer (PC), a mobile phone, a video telephone, an e-book reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted-Device (HMD) such as electronic glasses, electronic clothing, an electronic bracelet, an electronic necklace, an electronic appcessory, and a smart watch).

The electronic device may be a smart home appliance with a communication function. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

The electronic device may include at least one of various kinds of medical appliances (e.g., a Magnetic Resonance Angiography (MRA), a Magnetic Resonance Imaging (MRI), a Computed Tomography (CT), a scanning machine, an ultrasonic machine, and the like), a navigation device, a Global Positioning System (GPS) receiver, an Event Data Recorder (EDR), a Flight Data Recorder (FDR), a vehicle infotainment device, electronic equipment for a ship (e.g., navigation equipment, a gyrocompass, and the like for a ship), avionics, and a security appliance.

The electronic device may include at least one of a part of furniture or a building/structure including a communication function, an electronic board, an electronic signature receiving device, a projector, and various kinds of measuring instruments (e.g., a water meter, an electric meter, a gas meter, a radio wave meter, and the like).

The electronic device may be a combination of one or more of the aforementioned various devices.

FIG. 1 is a block diagram illustrating an electronic device in accordance with aspects of the present disclosure. The electronic device 100 may include a bus 110, a processor 120, a memory 130, an input/output interface 140, a display unit 150, a communication unit 160, a Direct Memory Access (DMA) controller 170, and a storage unit 180. The bus 110 may be a circuit connecting the aforementioned elements and transferring communication (e.g., a control message) between the aforementioned elements.

The processor 120 may receive data or signals from other elements through the bus 110, decipher the received data or signals, and perform operations or data processing according to the deciphered data or signals. The processor 120 may include a Memory Management Unit (MMU) 122, and the MMU 122 may convert a virtual address into a physical address and play a role in memory protection, cache management, bus mediation, and the like.

The memory 130 may store signals or data received from or generated by the processor 120 or other elements. The memory 130 may include, for example, a kernel and programming modules such as at least one application. The programming modules may be configured with software, firmware, hardware, or a combination of at least two or more thereof.

The input/output interface 140, for example, may receive instructions or data from a user, and transfer the received instructions or data to the processor 120 or the memory 130 through the bus 110. The display unit 150 may display images or data to the user.

The communication unit 160 may connect communication between other electronic devices 102 and 104 or a server 164 and the electronic device 100. The communication unit 160 may support short range wired/wireless communication (e.g., Wireless Fidelity (Wi-Fi), Bluetooth (BT), or Near Field Communication (NFC)) with the another electronic device 102. The communication unit 160 may support network communication (e.g., Internet, Local Area Network (LAN), Wide Area Network (WAN), telecommunication network, cellular network, satellite network, Universal Serial Bus (USB), Recommended Standard 232 (RS-232), Plain Old Telephone Service (POTS), or the like) with the another electronic device 104 or the server 164 through a wired/wireless communication network 162.

Other electronic devices 102 and 104 may be the same device as the electronic device 100 (e.g., the same type and/or configuration of device) or may be a device different from the electronic device 100 (e.g., a different type and/or configuration of device).

The DMA controller 170 may allow peripheral devices (the input/output interface 140, the communication unit 160, and the like) to directly access the memory 130 and read or write data without involving the processor. The memory 130 may be used for temporarily storing programming modules executed by the processor 120, and the storage unit 180 may be used for permanently storing the programming modules. For example, the memory 130 may be a volatile memory such as a Random Access Memory (RAM), and the storage unit 180 may be a nonvolatile memory such as a hard disk.

Figure 2:
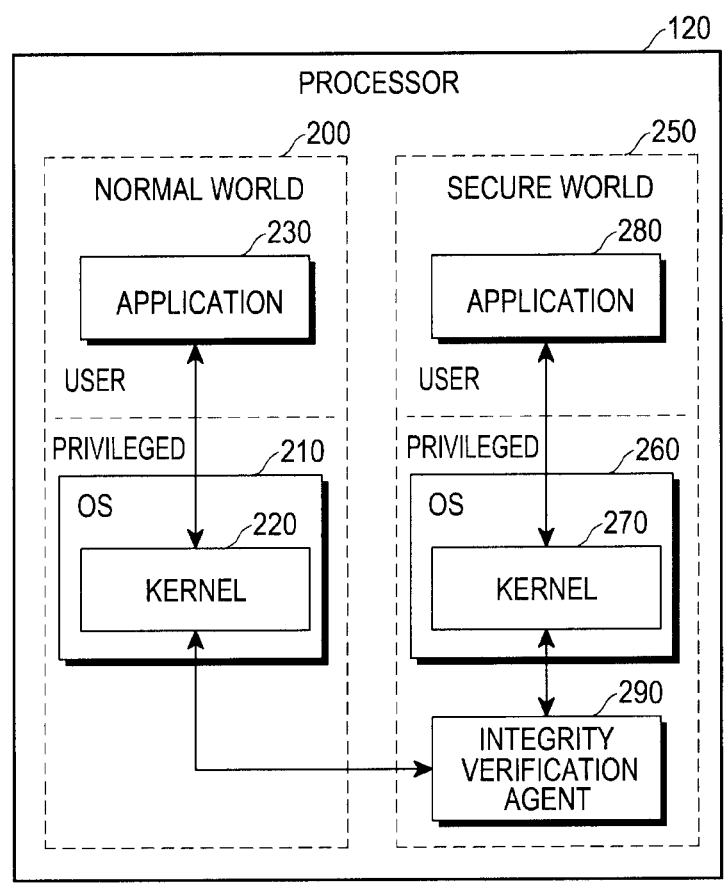
FIG. 2 is a block diagram illustrating an example software configuration of a processor.

FIG. 2 is a block diagram illustrating an example software configuration of a processor. The processor 120 includes a normal world virtual processor 200 (or a normal world) and a secure world virtual processor 250 (or a secure world). The normal world virtual processor 200 may include a normal world operating system 210 with a normal world kernel 220 and a normal world application 230. The secure world virtual processor 250 may include a secure world operating system 260 with a secure world kernel 270, a secure world application 280, and an integrity verification agent 290.

Hardware-based separation may be provided between the normal world virtual processor 200 and the secure world virtual processor 250. Processor architectures, such as an ARM® architecture provided by Advanced RISC Machines (ARM) Holdings plc, provide such separation. In the ARM, such a feature has been known as Trust Zone technology. The Trust Zone technology of the ARM enables the hardware-based separation for dividing code execution on a single physical processor core into two areas, namely, a secure world and a normal world (or a non-secure world). The secure world virtual processor is intended for security detection and the normal world virtual processor is intended for other operations.

The normal world operating system 210 may execute within the domain of the normal world virtual processor 200, and the reliable secure world operating system 260 and reliable components (e.g., the integrity verification agent 290) may execute in the domain of the secure world virtual processor 250. Such an arrangement may be implemented with various architectures. Although the ARM Trust Zone architecture is used in the present example, methods and technology described in the present disclosure may also be implemented with other processors which are currently known or will be developed later.

The normal world operating system 210 may be an arbitrary operating system, such as Android, Embedded Linux, or NetBSD, or may be another arbitrary operating system which is currently known or will be developed later. The normal world kernel 220 may serve to manage device resources. Code of the normal world kernel 220 may be executed in a privileged mode and the normal world kernel 220 may be allowed to execute privileged instructions and security critical operations.

The normal world virtual processor 200 may be provided with at least one normal world application 230 (e.g., a plurality of user processors and/or daemons) executed in an unprivileged user mode, and the normal world application 230 may be prevented from executing the privileged instructions and the security critical operations.

Similarly, code of the secure world kernel 270 may be executed in the privileged mode and the secure world virtual processor 250 may be provided with at least one secure world application 280 (e.g., a plurality of user processors and/or daemons) executed in the unprivileged user mode.

Specific operations (e.g., security critical operations and privileged instructions) attempted by normal world virtual processor 200 may be intercepted by the secure world virtual processor 250. For example, intercepting the security critical operations and the privileged instructions may include switching an execution context from the normal world virtual processor 200 to the secure world virtual processor 250. The security critical operations or the privileged instructions may be intercepted by the integrity verification agent 290 such that the normal world kernel is prevented from executing the operations. The integrity verification agent 290 may determine the effect of the intercepted operations upon the state of the system.

In another example, when operations or instructions are not intercepted by the integrity verification agent 290, the normal world kernel 220 may be modified to prevent the normal world kernel 220 from executing security critical operations or privileged instructions. For example, the normal world kernel 220 may be modified such that all the privileged instructions are removed from an executable binary thereof stored in the memory. The privileged instructions may include, but are not limited to, instructions for controlling a Memory Management Unit (MMU). The modified executable binary may be marked as read-only to prevent potentially malignant modification, such as an unauthorized instruction to add privileged instructions into the binary.

The normal world applications 230 (e.g., user processors), which may be the unprivileged programs, may be mapped into the memory as "privileged-execute never" such that they are prevented from executing the privileged instructions.

The normal world kernel 220 may be modified by using any technology that directly modifies source code, that modifies the executable binary, or that uses binary translation.

The normal world kernel 220 may be prevented from obtaining memory access required for executing the security critical operations. For example, security critical operations may modify page tables defining memory mapping or may modify DMA controller 170. DMA controller 170 may determine a memory 130 or an area of the memory 130, which peripheral devices can access. Attacks may attempt to use the DMA controller 170 so as to modify data or code of the normal world virtual processor 200 via the peripheral devices.

Integrity verification agent 290 may detect an attempt to execute security critical operations or privileged instructions that go against a predetermined security policy. Such policy may include detecting an integrity violation of the normal world kernel 220. For example, the policy may include, but are not limited to, not allowing modifications of the executable binaries of the normal world kernel 220, disabling memory access protection of the normal world kernel 220, or modifying critical data structures of the normal world kernel 220 to read-only.

In one example, security attacks attempting to modify the normal world kernel 220 or a part thereof may be prevented. In a further example, technology and/or methods for detecting malignant attacks that generate up to date reports on the integrity of normal world kernel 220 may be employed. In yet a further example, technology and/or methods that may prevent instructions and/or operations capable of damaging the integrity of the normal world kernel 220 may be implemented. In yet another example, technology and/or methods for detection or prevention of malignant attacks or a combination of both may also be utilized.

In another aspect, methods, modules, and/or devices, may include one or more of the following:

Active monitoring of normal world critical events (e.g., security critical operations and privileged instructions) and recognizing any influence of these events on the state of the normal world operating system 210.

Complete control of a normal world memory layout. Secure world virtual processor 250 may identify whether verified normal world applications 230 are secure after being loaded and may confirm that unverified normal world applications 230 are precluded from executing privileged instructions or security critical operations. Such capability may be known as "memory protection".

Integrity verification that may be based on a predetermined security policy. Input events used to verify whether one or more security policies are violated may result from the aforementioned active monitoring and/or memory protection.

The integrity verification (or measurement) agent 290 may be executed as part of the secure world virtual processor 250 and the normal world operating system 210 may execute in the normal world domain The secure world virtual processor 250 may perform load-time verification of the normal world kernel 220 by calculating a checksum of binaries loaded in memory 130 (this process may be referred to as static measurement).

Furthermore, the load-time verification may be expanded to verify whether the normal world kernel 220 is properly modified for the intended protection, by removing all the privileged instructions from the binaries.

An idea of using separated or protected components to verify a universal system has been described in "Terra; A Virtual Machine-Based Platform for Trusted Computing" by Grafinkel et al., SOSP (2003), and the entire contents thereof are hereby incorporated in the present specification by reference. Static measurement may secure the integrity of the normal world kernel 220 during the boot-up process. However, static measurement may not be able to secure the normal world kernel after normal world operating system 210 is booted up and interacts with potential attackers.

Normal world kernel 220 may execute the privileged instructions in the normal world virtual processor 200. Furthermore, normal world kernel 220 may not be limited by a mix of writeable and executable pages. A plurality of recent versions of operating system kernels (e.g., Android and Linux) may separate executable code from writeable data.

In one example, all attacks aimed at confidentially executing code within normal world operating system 210 may be considered. In another example, the term "confidentially" may be defined as code executing without updating the integrity verification agent 290. Such attacks may be performed by loading new unverified code binaries or changing code binaries already existing in memory before updating the integrity verification agent.

In another example, all attacks aimed at modifying security critical data within the normal world operating system 210 may be considered. In this instance, the security critical data may be defined in advance such that the integrity verification agent 290 monitors the modification thereof.

Attackers may penetrate the normal world operating system 210 by using existing system weaknesses, including kernel weaknesses that enable them to control the normal world kernel. In an example, loading of new code or modifying existing code may be detected and prevented.

Nevertheless, special types of attacks exist that do not require modification or loading of code. These type of attacks may be known as return-oriented attacks. In a further example, these attacks may be prevented from loading new applications (e.g., malignant Apps) without being measured by the integrity measurement agent in the secure world domain.

While the ARM Trust Zone may be employed, it may restrict close control of the normal world operating system. Hereinafter, drawbacks and limitations faced in implementing active monitoring and memory protection using the ARM Trust Zone architecture will be described:

The main objective of Trust Zone technology is to generate a hardware separation environment for preventing security critical assets (memory areas belonging to the secure world and peripheral devices) from being accessed by the normal world. However, such a separation provides one of the two worlds with complete control of its own resources. Accordingly, the normal world kernel has complete control of the physical memory allocated thereto and this includes complete control over the Memory Management Unit (MMU) and over allocating access permissions (e.g., read-only, writeable, and executable) to its mapped memory pages. Such an architecture may cause problems when secure world components monitor and protect the critical memory areas belonging to the normal world.

Furthermore, the Trust Zone may enable secure world virtual processor 250 to select a series of events to be processed by secure world virtual processor 250, but these events are limited to external interrupts (IRQs or FIQs) and specific types of exceptions (e.g., external data aborts). However, other types of exceptions and main events (e.g., regular data abort exceptions or monitoring mode calls used for system calls) may not be intercepted by the secure world virtual processor and are directly processed by the normal world virtual processor. Such events may influence the integrity of the normal world. When these events are not intercepted by the secure world virtual processor, any negative effect on the integrity of the normal world may be overlooked by the integrity verification agent.

In further example, active monitoring of the normal world virtual processor 200 may be carried out by intercepting main events by the secure world virtual processor 250. Furthermore, complete protection of the normal world memory area using virtual memory access permission flags may be provided. In another example, background technology for three architecture principles of an ARM v7 processor may be employed. As described above, it will be understood that the methods and technology of the present disclosure may be implemented in arbitrary processor architectures, which are currently known or will be developed later, in addition to the ARM v7 architecture referred to herein.

The ARM v7 architecture supports coprocessors to expand functions of the ARM v7 processor. Coprocessor instructions provide access to sixteen coprocessors (0 to 15). Coprocessor 15 (124, CP15) provides system control registers for controlling most processors and memory system features (e.g., an MMU, an interrupt vector handler, caching, performance models).

Access to the ARM v7 CP15 (124) for reading and writing may be performed through special instructions (e.g., Move from resister to coprocessor (MCR) and LDC). This may be limited to privileged software or an application (e.g., a kernel code). Furthermore, the ARM v7 virtual memory system architecture allows a prescribed set of memory pages to be executed in a privileged mode by using Privileged Non eXecute (PXN) access permission.

An ARM instruction set (thumb or arm) is configured with native code including a sequence of 32-bit or 16-bit aligned single binary instructions. Each of the binary instructions includes opcode and operands of a single 32-bit or 16-bit binary word.

The active monitoring may be summarized as the following: the normal world may be initialized such that only particular memory areas (prescribed by virtual memory access control) may execute privileged code. This may be performed by loading an initial image of the normal world operating system 210 that has been reliably configured in advance.

These privileged memory pages may be marked as non-writeable and may be thoroughly checked so as not to include any instruction performing privileged operations (e.g., instructions for modifying critical registers of the CP15 (124) of the ARM v7 architecture). This may prevent the normal world virtual processor 200 to execute such instructions. Accordingly, the normal world kernel 220 may not modify processor functions controlled by these instructions (e.g., functions controlled by the specific critical CP 15 registers of the ARM v7 architecture).

Examples of the active monitoring and memory protection frameworks may be implemented by using one or more of the following:

1) After initializing electronic device 100, the virtual memory map of the normal world may be configured such that privileged code pages including interrupt and exception processing vectors are marked as non-writeable by the normal world virtual processor or the secure world virtual processor 250.

2) All other normal world mapped pages belonging to the kernel or the user processes may be marked as PXN pages so as not to allow them to execute the privileged instructions that modify the state of the normal world (e.g., accessing particular security critical registers of the ARM v7 CP 15(124)).

3) All page tables used to define the normal world memory layout and access control may be marked as non-writeable. Accordingly, arbitrary modifications to the page tables may cause a data abort exception. These page tables may be indicated in the ARM v7 CP 15 Transformation Table Base Registers (TTBRs) or in other registers in other architectures having functionality similar to the TTBRs.

4) The non-writeable kernel pages may be modified such that a call to the secure world virtual processor 250 (e.g., Secure Monitor Call (SMC) instruction) is substituted for security critical operations and privileged instructions (e.g., a data abort exception handler, an instruction abort handler, records for the page tables, and CP15 register records). Accordingly, all these security critical operations and privileged instructions may be processed by the secure world virtual processor 250.

5) The secure world virtual processor 250 may check main events and transfer them to the integrity verification agent to evaluate their influence on the integrity of the system. When the intercepted event corresponds to the page table record, the secure world virtual processor 250 may deem the event compliant with the predetermined security policy. The secure world virtual processor 250 may then perform needed page table modifications in place of the normal world kernel 220. The predetermined security policy may include preventing access to the original kernel pages or arbitrary page tables. It may also include preventing mapping of the privileged executable pages.

6) The integrity verification agent 290 may use a non-transitory computer readable medium (e.g., a volatile or non-volatile memory) to store information associated with the normal world memory map and/or to store information associated with the state of the required security policy. In one example, the integrity verification agent may store a bitmap in which a state of each page of the normal world is marked. Such bitmap may be used to detect whether ID records for this page (or modified memory mappings in the corresponding page table items) violate the security policy.

The foregoing items enable active monitoring of the normal world kernel 220 and enable protection of the kernel memory. Items 1 and 2 prevent potential malignant software in the normal world from executing privileged instructions by mapping the instructions of the memory 130 or by modifying any of the privileged mapped instructions. Since the native ARM code is configured with only 32-bit or 16-bit instructions, it may be possible to scan the executable privileged pages word by word and confirm that none of the instructions access the critical register.

FIG. 3 illustrates sample encoding of MCR instructions for writing to CP registers in the ARM v7 architecture. In this example, the CP registers are defined by a CP number and four different parameters, namely, CRn, CRm, opc1, and opc2. The opc1 and opc2 represent op codes, the CRn and CRm represent coprocessor registers, Rt represents ARM source registers, coproc represents a name of the coprocessor, and cond represents an optional condition code.

When all 32-bit (aligned) values of the privileged executable pages are checked so as to prevent any instruction from matching MCR for this particular register, normal world virtual processor 200 may be prevented from modifying this register. In one example, critical target registers may be defined as registers that disable the MMU, rearrange the interrupt vector handler, and/or rearrange the base address of the virtual processing conversion tables.

Item 3 above ensures that memory protection is carried out. In the ARM v7 architecture, the TTBRs indicating the base of the page tables are a part of the CP15 (124). The TTBRs (as described in item 2) are marked between those registers prevented from being modified by the normal world kernel. Accordingly, the normal world is restricted to using a particular physical memory as the page tables. An initialization code marks this physical memory (page tables) as non-writeable. In this instance, arbitrary page table updates may cause a data abort. Since all data abort exceptions (as described in item 4 above) are intercepted by secure world virtual processor 250, all the page table modifications are checked by the secure world before being actually generated in the normal world.

Item 4 ensures that active monitoring is implemented. In the ARM v7 architecture, it may not be possible to execute main events such as modifying a TTBR value to a context switch between user processes in the normal world virtual processor 200. Therefore, in one example, the normal world kernel 220 may call an "SMC" instruction so that a critical operation is processed by the secure world virtual processor 250. Security of this operation may be supported since the CP register records and "SMC" calls are atomic operations configured with a single instruction. At the same time, all integrity checks (e.g., verifying that new page tables do not have writeable privileged pages) may be performed in the secure world domain without being affected by the normal world domain. Any kernel invaded by the return-oriented attack may be prevented from modifying critical states by jumping through the middle of complex code and skipping potential normal world integrity verification.

Lastly, implementation of item 5 may allow the secure world domain to become a single point of integrity verification by ensuring that active monitoring capacities are maintained throughout the life span of the system. The secure world virtual processor 250 may ensure both memory protection and active monitoring of the normal world, by implementing proper integrity checks for privileged operations. Such integrity checks may include, for example, verifying newly mapped page tables of processors and verifying that the MMU or virtual page access control protections were not disabled.

The normal world virtual processor 200 and the secure world virtual processor 250 may be Trust Zone virtual processors described in "ARM Security Technology, Building a Secure System using Trust Zone Technology, ARM Whitepaper, ARM Limited (2009)", the entire contents of which are incorporated in the present specification by reference. The electronic device 100 may be an arbitrary computing platform that may be divided by using the normal world virtual processor 200 and the secure world virtual processor 250. The computing platforms may include a mobile device such as a server, desktop computer, a smart phone, a Personal Digital Assistant (PDA), a tablet computer, or an embedded system capable of embedding processors and related memories in a home or industrial device.

As described above, the normal world operating system 210 may be executed in the domain of normal world virtual processor 200 and the integrity verification agent 290 may be executed in the domain of secure world virtual processor 250. Execution of predetermined critical operations may be intercepted by secure world virtual processor 250. Examples of the intercepted operations may include regular data abort exception or supervision mode calls used for system calls. The intercepted operations may be executed by the secure world virtual processor 250. The integrity verification agent 290 may monitor the operations intercepted by secure world virtual processor 250 to evaluate their effect on the integrity of the electronic device 100.

For example, the electronic device 100 may be a smart phone and a user may switch between a voice call and an e-mail application. In such a situation, the normal world operating system 210 may switch between processes by writing a new value to CP15 (124). As described above, attempts to write to the CP15 (124) may be intercepted and transferred to integrity verification agent 290. The integrity verification agent 290 may examine the value written in the CP15 (124). In the present example, the value may be a process ID or a memory location of the e-mail application. In order to verify the process ID, the integrity verification agent 290 may search a list of allowed processes. In the present example, if the e-mail application is on the list, the secure world virtual processor 250 may allow the e-mail application to be executed.

In another example, the process ID or the memory location attempting to be written to CP15 (124) may correspond to malware that is not in the list of allowed applications. In such a situation, the secure world virtual processor 250 may prevent the malware from being executed. In another example, integrity verification agent 290 may negotiate with an external system to verify an application or process by using a cryptographic signature of the application.

Figure 4A:
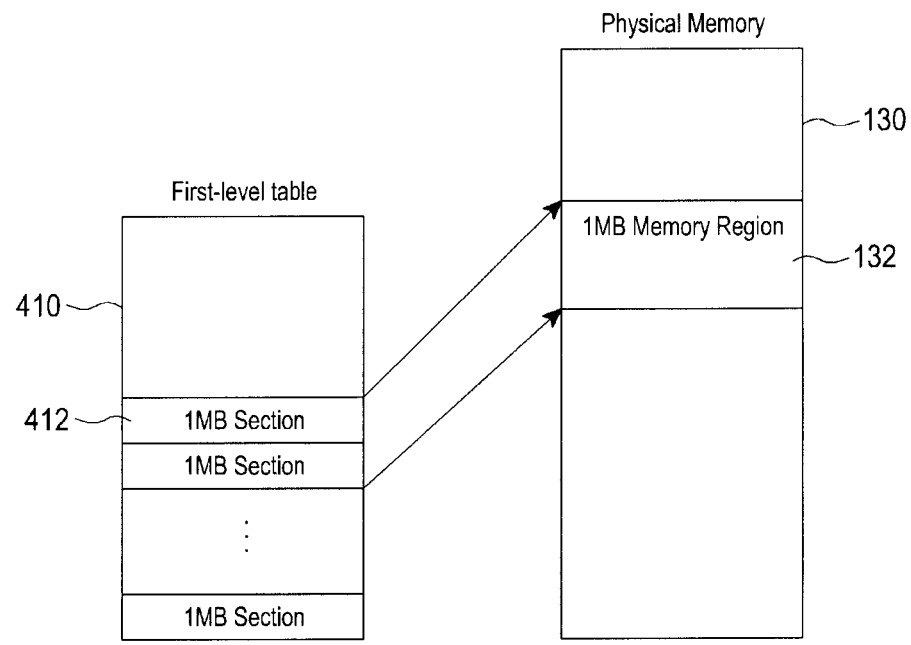
FIG. 4A and FIG. 4B are an example page table in accordance with aspects of the present disclosure.

Referring now to FIG. 4, an example page table in accordance with aspects of the present disclosure is shown. FIG. 4A illustrates an example L1 memory mapping. In this example, a total physical memory 130 is divided into pages 132 such that each page is 1 MB. Page table 410 includes items 412 such that each item 412 is associated with a page 132 of memory 130. Each of the table items 412 may include identification information of the corresponding memory page 132 (e.g., one portion or all of the physical address of the memory page 132, a memory page number or ID, and the like) and additional information (writeable or not).

Figure 4B:
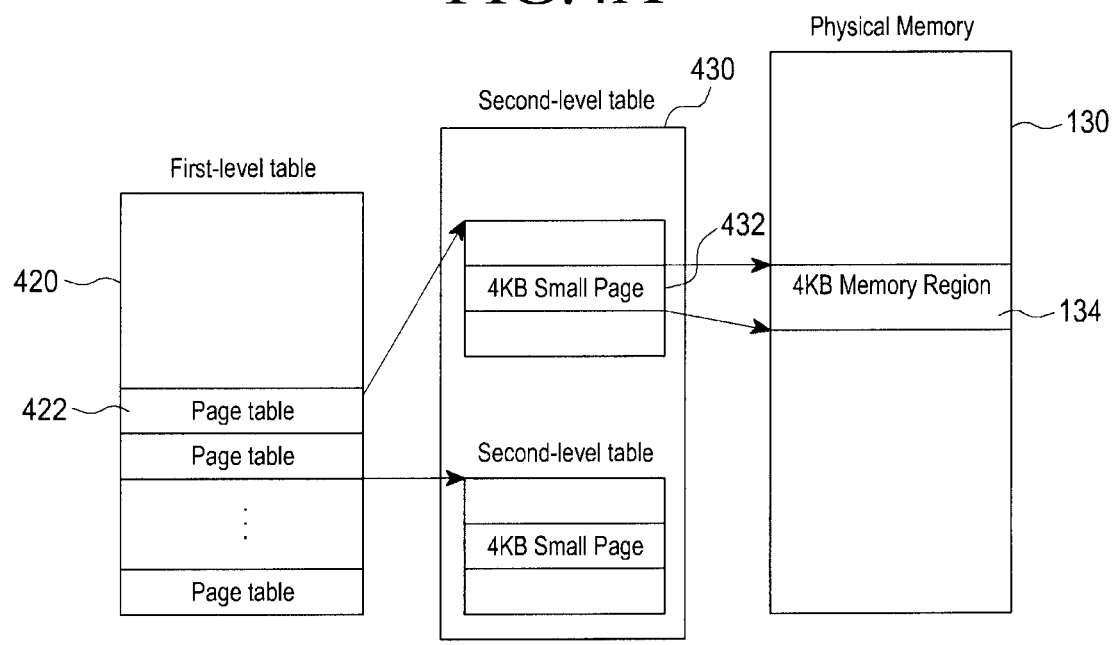

FIG. 4B shows an example L2 memory mapping. In this example, a total physical memory 130 is divided into pages 134 such that each page is 16 KB or 4 KB in size. A second page table 430 includes items 432 such that each item 432 is associated with a page 134 of physical memory 130. In first page table 420, each item 422 may be associated with an item 432 in the second page table 430. Each items 432 of the second page table 430 may include identification information of the corresponding memory page 134 (e.g., one portion or all of the physical address of the memory page, a memory page number or ID, and the like) and additional information (writeable or not). Each item 422 of first page table 420 may include identification information of the corresponding item 432 of the second page table 430 (e.g., one portion or all of the physical address, an item number or ID, and the like) and additional information (writeable or not).

Figure 5:
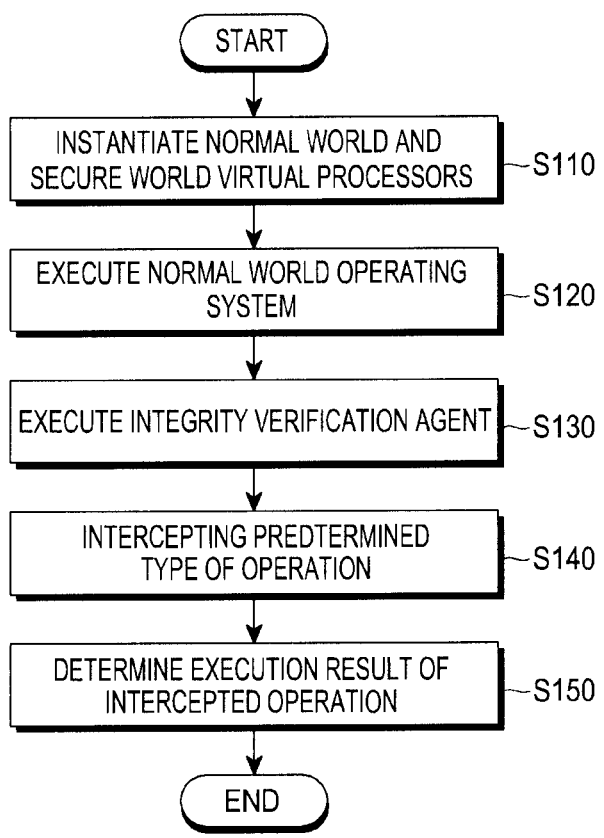
FIG. 5 is a flowchart illustrating an example integrity verifying method in accordance with aspects of the present disclosure.

FIG. 5 is a flowchart illustrating an example integrity verifying method in accordance with aspects of the present disclosure.

At block S110, a normal world virtual processor 200 and a secure world virtual processor 250 may be instantiated in an electronic device 100. The instantiation may comprise sequential booting of secure world operating system 260 and normal world operating system 210. A secure world virtual processor 250 may be separated and protected from the normal world virtual processor 200. Data and code of the secure world virtual processor 250 may be inaccessible by the normal world virtual processor 200. Data and code of the normal world virtual processor 200 may be accessible by secure world virtual processor 250.

Instantiation of the normal world virtual processor 200 may include generating a virtual memory map of normal world virtual processor 200 that defines the memory access of privileged code pages as "non-writeable". The privileged code pages may include interrupts for processing a vector or exceptions for processing a vector.

The virtual memory map of the normal world virtual processor 200 may define the memory access of unprivileged code pages as "privileged execute never (PXN)". This memory access setting may prevent one or more unprivileged code pages from executing security critical operations or privileged instructions.

At block S120, the normal world operating system 210, which may be a target of attack, may be executed by a normal world virtual processor 200.

At block S130, an integrity verification agent 290 may be executed by the secure world virtual processor 250.

At block S140 the secure world virtual processor 250 may intercept (or trap) an operation attempted by the normal world virtual processor 200. The operation may be a predetermined type of operation. The types of operations that may be intercepted includes, but are not limited to, a security critical operation, a privileged instruction, an instruction that can disable or modify virtual memory access protection provided by an MMU of the normal world virtual processor 200, an instruction that can modify one or more predetermined registers associated with a processor or coprocessor of the electronic device 100, an instruction that can modify code or critical read-only data associated with the electronic device 100, an instruction that can modify a DMA controller 170 associated with the electronic device, a regular data abort exception, or a supervision mode call used for system calls. The intercepted operations may also include an instruction that can disable, modify, or mitigate the integrity verification agent. Thus, these intercepted operations may be executed by the operating system in the secure world domain or the integrity verification agent 290 in lieu of the operating system in the normal world domain, by switching an execution context from the normal world virtual processor 200 to the secure world virtual processor 250.

An intercepted operation may be replaced by calls to the secure world virtual processor 250, by intercepting security critical operations associated with attempts to write to privileged code pages.

The normal world operating system 210 of the normal world virtual processor 200 may be modified by changing its source code, changing its executable binary, or by converting its binary.

At block S150, the integrity verification agent may determine (or detect) an execution result of the intercepted operation. The integrity verification agent 290 may perform a static integrity check of normal world operating system 210. Detecting the execution result of the intercepted operation may include performing a mitigation action. Such mitigation action may include blocking execution of the intercepted operation, issuing a security alert, or shutting down the electronic device 100. The integrity verification agent 290 may use a security policy and the mitigation action may occur in response to the intercepted operation, which may attempt to violate the security policy.

Figure 6:
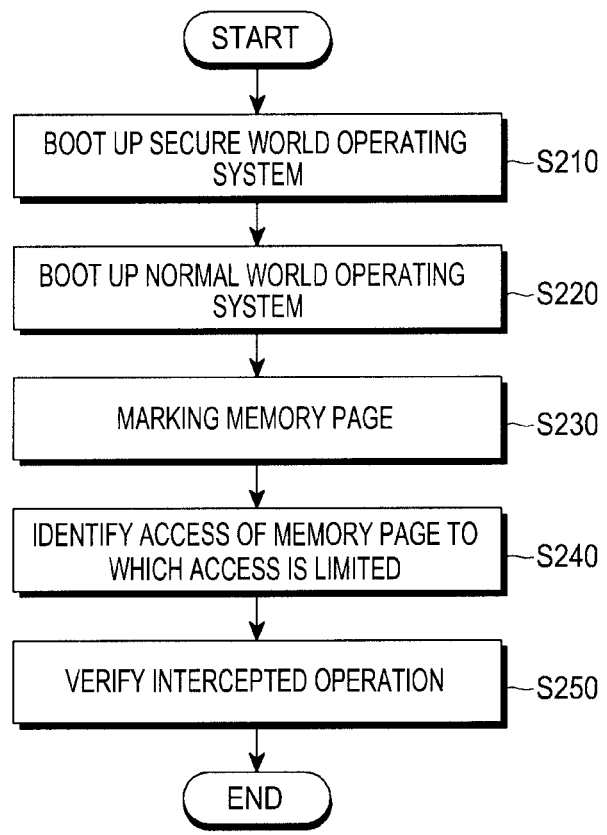
FIG. 6 is a flowchart illustrating a further example integrity verifying method in accordance with aspects of the present disclosure.

FIG. 6 is a flowchart illustrating an integrity verifying method according to another example of the present disclosure.

Step 210 is a step for booting a secure world operating system 260, and when an electronic device 100 is powered on, a processor 120 may boot up the secure world operating system 260.

Step S220 is a step for booting a normal world operating system 210, and when the secure world operating system 260 is completely booted up, the processor 120 may boot up the normal world operating system 210.

Step S230 is a step for marking memory pages, and while the normal world operating system 210 is being booted up or after that, the processor 120 marks particular memory pages of the normal world operating system 210 such that access thereto is limited. For example, a particular memory page of the normal world operating system 210 may be marked as non-writeable, execution prohibition of privileged instructions modifying the state of the normal world, and the like. Such marking or access limitation information may be written in additional information of page table items for the normal world operating system 210, or may be stored as a separate table or virtual memory map. Each item of the separate table may include identification information and access limitation information for the corresponding page table item.

Step S240 is a step for identifying access of the memory page to which access is limited, and when an operation (or an instruction) for the memory page to which the access is limited is attempted, the normal world operating system 210 intercepts the operation by an integrity verification agent 290.

Step S250 is a step for verifying the intercepted operation by using the integrity verification agent 290. Determining execution results of the intercepted operation by using the integrity verification agent 290 may include performing a mitigation action.

Figure 7:
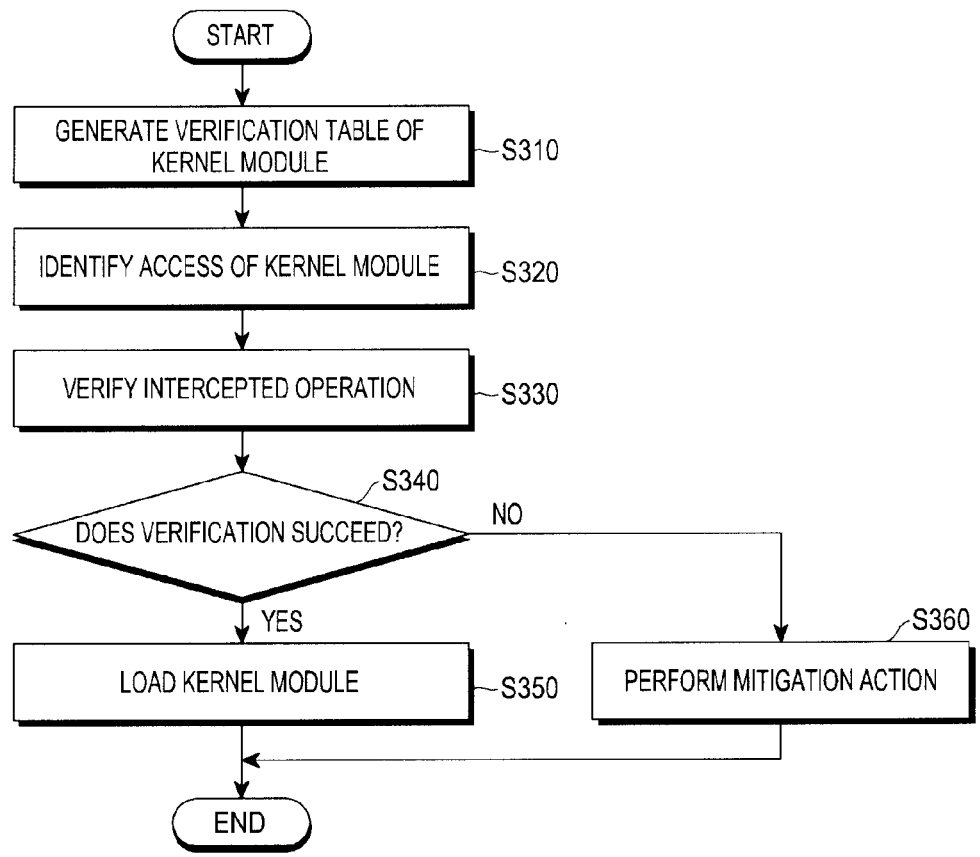
FIG. 7 is a flowchart illustrating yet another example integrity verifying method in accordance with aspects of the present disclosure.

FIG. 7 is a flowchart illustrating another example integrity verifying method. At block S310, processor 120 may generate a verification table for a kernel module of normal world operating system 210 while the normal world operating system 210 is being booted or before the kernel module attempts to load. For example, the verification table may be generated during or after the kernel module is built.

Each item of the verification table may include identification information for the corresponding kernel module (e.g., one portion or all of a physical address of the corresponding memory page, a memory page number or ID, a kernel module number or ID, and the like) and a hash value (i.e., a verification value) of the corresponding kernel module. While the verification value is shown in this example as a hash value, the verification value may also be data representing at least one portion of the corresponding kernel module or a value obtained by calculating or encrypting the data by using a function or algorithm configured in advance.

At block S320, access of the normal world kernel module may be identified. Thus, when normal world operating system 210 attempts to load the kernel module, an integrity verification agent 290 may intercept (or trap) the operation.

At block S330, the integrity verification agent 290 may verify the intercepted operation. The integrity verification agent 290 may calculate the hash value of the normal world kernel module and compare the calculated hash value with the corresponding hash value of the verification table. The integrity verification agent 290 may compare at least some data of the normal world kernel module or a value obtained by calculating or encrypting the data using a preconfigured function or algorithm to a corresponding value in the verification table.

At block S340, the verification is identified. When verification of the intercepted operation succeeds, the normal world kernel module may be loaded at block S350. When the verification of the intercepted operation fails, the aforementioned mitigation action (e.g., occurrence of a security alert) may be performed at block S360. For example, integrity verification agent 290 may display an alert or a message, via display unit 150, that notifies a user of the kernel module loading failure.

Figure 8:
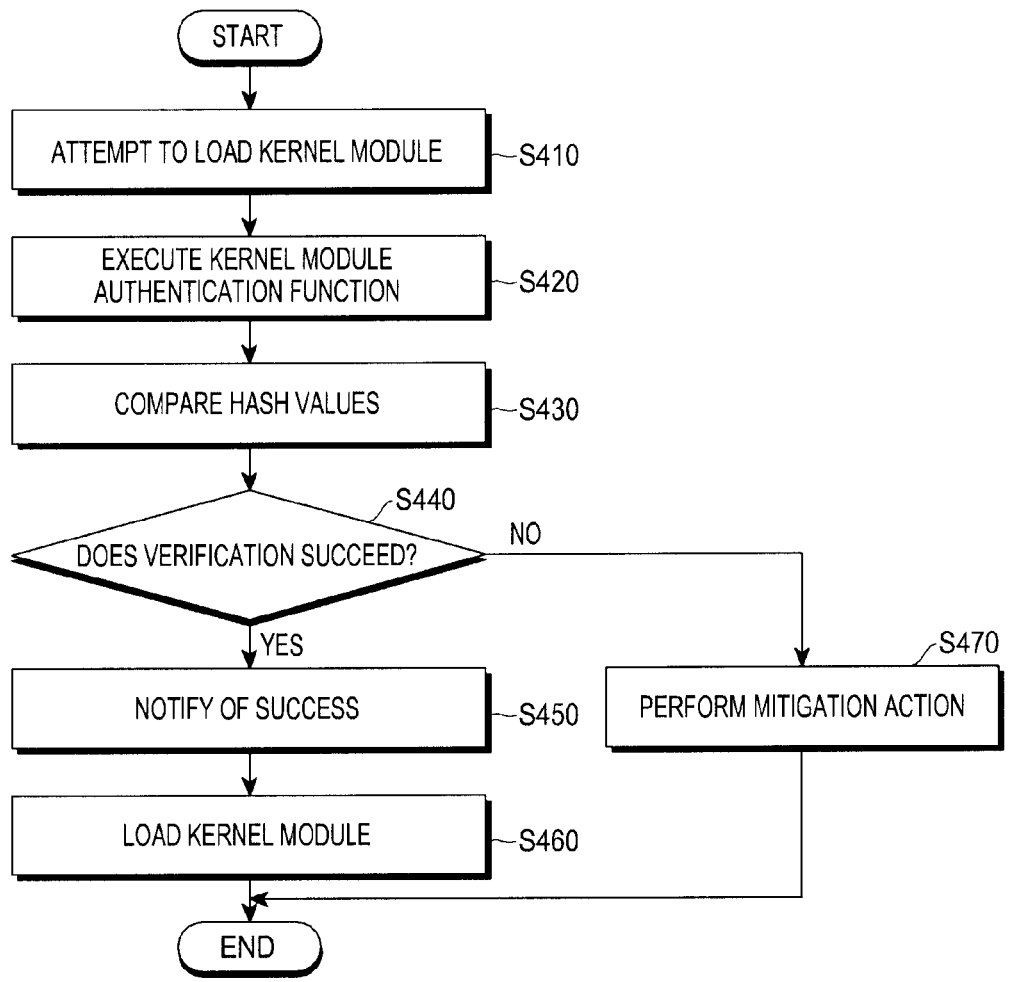
FIG. 8 is a flowchart illustrating yet a further example integrity verifying method in accordance with aspects of the present disclosure.
Figure 9:
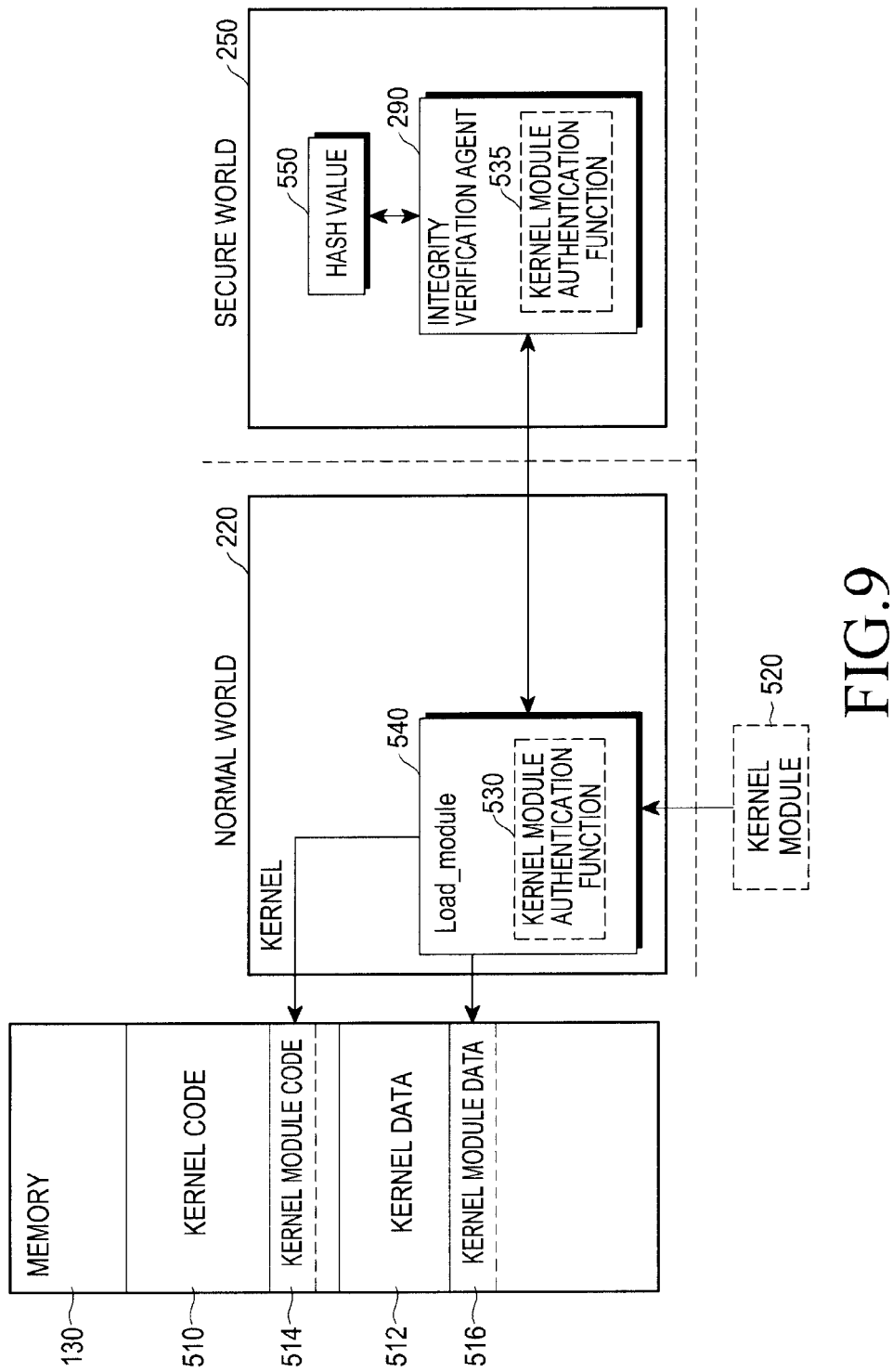
FIGS. 9 and 10 are example views for a description of FIG. 8.
Figure 10:
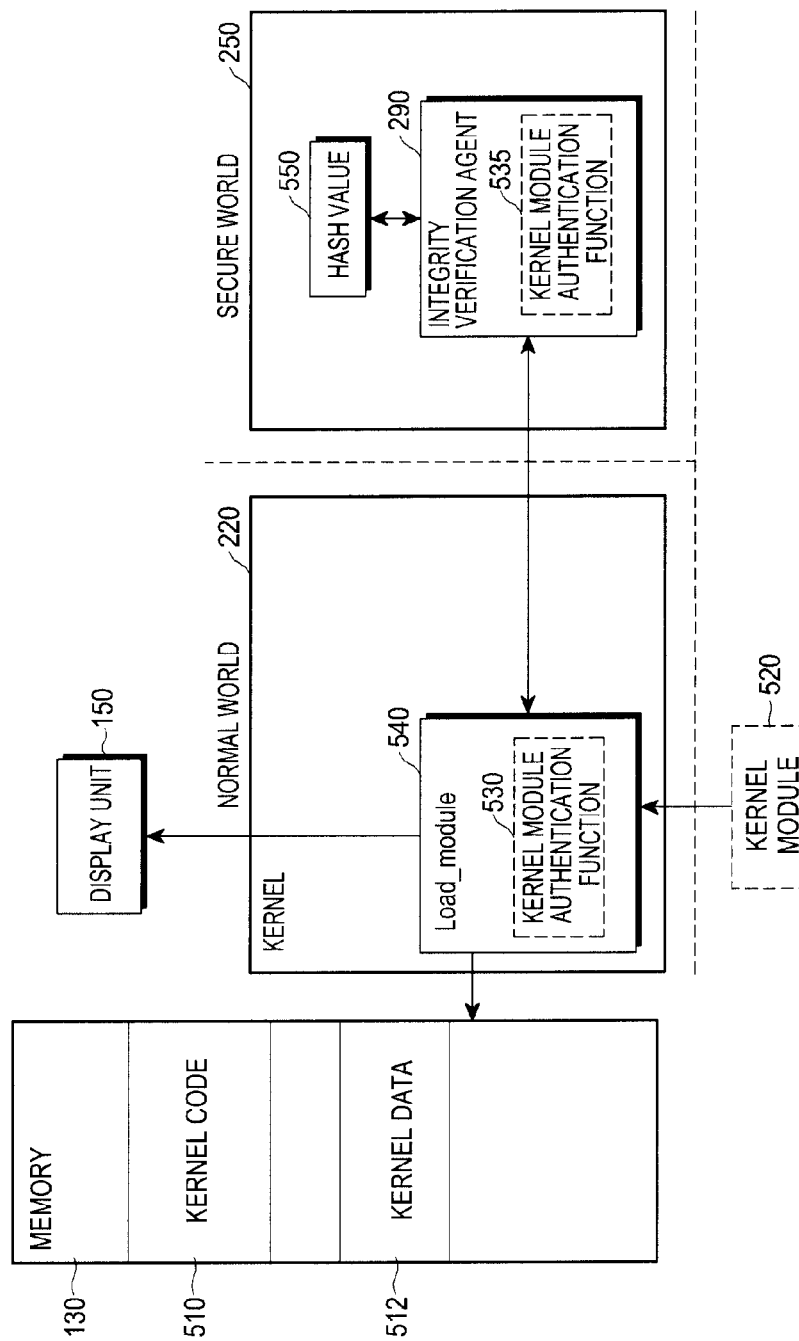

FIG. 8 is a flowchart illustrating a further integrity verifying method in accordance with aspects of the present disclosure and FIGS. 9-10 are working examples of the flowchart in FIG. 8.

At block S410, a kernel module 520 may be loaded by normal world kernel 220 or normal world application 230. For example, the insmod command of the normal world kernel 220 may be performed. The insmod command may load the kernel module and may include identification information of the kernel module 520 or code of the kernel module 520.

At block S420, a kernel module authentication function may be executed. As the kernel module 520 attempts to load (e.g., insmod command), a load module 540 serving to load the kernel module may be executed. The load module 540 may execute a first kernel module authentication function 530 (e.g., a lkmauth function) that may interact with secure world virtual processor 250. The load module 540 may transfer identification information associated with the kernel module 520 or the code of the kernel module 520 to an integrity verification agent 290.

At block S430, hash values may be compared. The integrity verification agent 290 may execute a second kernel module authentication function 535 (e.g., a lkmauth function) when receiving the identification information associated with kernel module 520 or when receiving the code of the kernel module 520. The integrity verification agent 290 may calculate a hash value of the kernel module 520 in accordance with the second kernel module authentication function 535, and may compare the calculated hash value with a hash value in a verification table. While a hash value is shown as a representative example of a verification value, the verification value may also be data representing at least one portion of the kernel module 520 or a value obtained by calculating or encrypting the data.

At block S440, it may be determined whether the verification has succeeded. In one example, the verification succeeds when the calculated hash value is identical to the hash value of the verification table. If the verification succeeds, integrity verification agent 290 may move to block S450. At block 470, integrity verification agent 290 may perform a mitigation action when the verification fails.

At block S450, the integrity verification agent 290 may notify load module 540 that the verification succeeded. At block S460, load module 540 may load the kernel module 520 in a memory 130 upon receiving notification of the successful verification. Referring to FIG. 9, the memory 130 may include an area 510 where kernel code is stored, an area 512 where kernel data is stored, an area 514 where code for the kernel module 520 is stored, and an area 516 where data for the kernel module 520 is stored. The area 514 where the code for kernel module 520 is stored may have an attribute of read-only (RO), and the area 516 where the data for the kernel module 520 is stored may have an attribute of read-write (RW).

At block S470, the integrity verification agent 290 may perform a mitigation action. Referring now to FIG. 10, the integrity verification agent 290 may notify load module 540 of the verification failure, and the load module 540 may reject the loading of the kernel module and perform the mitigation action such as displaying the loading failure of the kernel module 520 to a user through a display unit 150.

Figure 11:
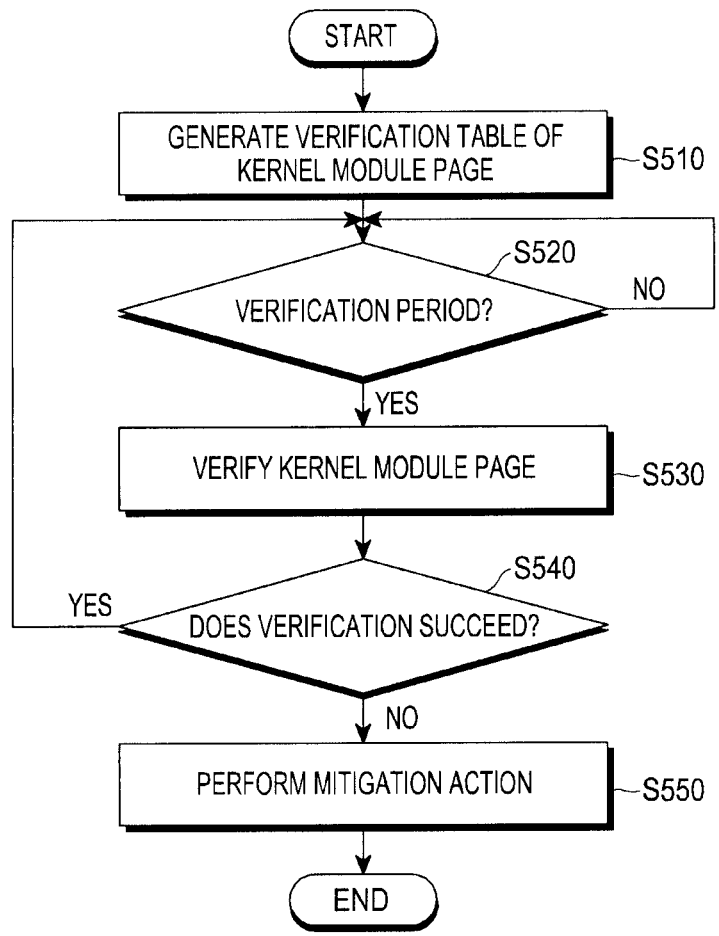
FIG. 11 is a flowchart illustrating an additional example integrity verifying method in accordance with aspects of the present disclosure.

FIG. 11 is a flowchart illustrating yet another integrity verifying method in accordance with aspects of the present disclosure. At block S510, a verification table may be generated by a processor for a kernel module of a normal world operating system 210. The verification table may be generated while the normal world operating system 210 boots or before the kernel module attempts to load. Each item in the verification table may include identification information for the corresponding kernel module (e.g., one portion or all of a physical address of the corresponding kernel module page, a kernel module page number or ID, a kernel module number or ID, and the like) and a hash value of the corresponding kernel module. As noted above, in lieu of a hash value, the verification value may also be data representing at least one portion of the corresponding kernel module or a value obtained by calculating or encrypting the data.

Figures 12A, 12B:
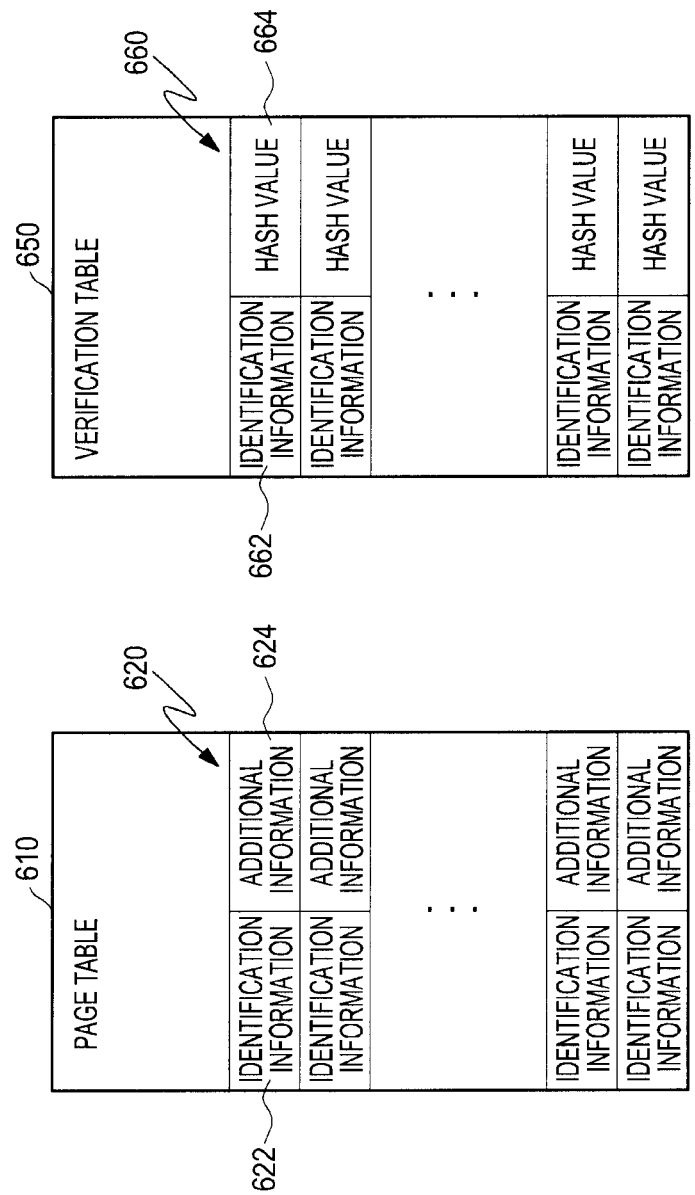
FIG. 12A and FIG. 12B illustrate an example page table and verification table in accordance with aspects of the present disclosure.

FIG. 12 illustrates an example of a page table (FIG. 12A) and a verification table (FIG. 12B). A page table 610 may include a plurality of items 620, and each of the table items 620 may include identification information 622 of the corresponding kernel module page 660 (e.g., one portion or all of the physical address of the kernel module page, the kernel module page number or ID, and the like) and additional information 624 (writeable or not).

A verification table 650 may include a plurality of items 660, and each of the table items 660 may include identification information 662 of the corresponding kernel module page 620 (e.g., one portion or all of the physical address of the kernel module page, kernel module page (or the page table item) number or ID, kernel module number or ID, and the like) and a hash value 664 of the corresponding kernel module page.

At block S520, the verification period may be identified. Integrity verification agent 290 may identify whether the preconfigured verification period has arrived. The integrity verification agent 290 may periodically verify the kernel module page. Furthermore, the verification period may vary depending on a power level state (active, standby, sleep, or the like) of an electronic device (e.g., 5 minutes, 15 minutes, and 60 minutes may be allocated to the active state, the standby state, and the sleep state, respectively), and the number or amount of pages verified in the respective verification periods may be arbitrarily configured.

At block S530 the kernel module page may be verified by using integrity verification agent 290. The integrity verification agent 290 may calculate the hash value of the normal world kernel module and compare the calculated hash value to the corresponding hash value in the verification table. The integrity verification agent 290 may also compare at least some other data of the normal world kernel module or a value obtained by calculating or encrypting the data by using a function or algorithm to a corresponding value in the verification table.

At block S540, the verification may be confirmed. When the verification of kernel module page has succeeded, block S520 may be repeated. When the verification of the kernel module page has failed, the aforementioned mitigation action (e.g., occurrence of a security alert) may be performed at block S550. For example, integrity verification agent 290 may display an alert or a message, via display unit 150, informing a user that authentication of the kernel module has failed.

While the examples herein refer to kernel module pages, it is understood that the techniques of the present disclosure may also be applied to other types of memory pages.

It may be appreciated that the examples of the present disclosure may be implemented in a form of software, hardware, or a combination thereof. For example, each component element such as the memory, the communication unit, the processor, and the like in the electronic device illustrated in FIG. 1 may be configured as a device. The software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, which are machine (e.g., computer) readable storage media, regardless of its ability to be erased or its ability to be re-recorded. It may be appreciated that the memory or the storage unit which may be included in the electronic device is one example of the machine-readable storage media suitable for storing a program or programs including instructions for implementing the various examples of the present disclosure. Accordingly, the present disclosure includes a program including a code for implementing a device or a method described in any claim in the present specification, and a machine-readable storage medium storing such a program. Furthermore, the program may be electronically transferred by any communication signal through a wired or wireless connection, and the present disclosure appropriately includes equivalents of the program.

Moreover, the electronic device may receive the program from a program providing device connected thereto in the wired or wireless manner, and may store the received program. The program providing device may include a program including instructions allowing the electronic device to perform the integrity verifying method of the electronic device, a memory for storing information required for the integrity verifying method of the electronic device, a communication unit for performing wired or wireless communication with the electronic device, and a controller transmitting the corresponding program to the electronic device according to a request of the electronic device or automatically.

In addition, the terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Although specific examples are described in the above description of the present disclosure, various modifications can be made without departing from the scope of the present disclosure. Accordingly, the scope of the present disclosure shall not be determined by the above-described examples, and is to be determined by the following claims and their equivalents.

What is claimed is:

1. A method of verifying integrity of an electronic device, the method comprising:
   instantiating a normal world virtual processor and a secure world virtual processor for the electronic device;
   executing an integrity verification agent within a domain of the secure world virtual processor;
   intercepting, by the secure world virtual processor, an operation attempted by the normal world virtual processor in which the operation is associated with a kernel module; and
   verifying, by the integrity verification agent, the intercepted operation,
   wherein the verifying of the intercepted operation includes:
     obtaining a verification table for the kernel module;
     calculating a hash value of the kernel module; and
     comparing the calculated hash value of the kernel module with a corresponding hash value stored in the verification table; and
   loading the kernel module when the calculated hash value of the kernel module is identical to the corresponding hash value stored in the verification table.

2. The method of claim 1, wherein the intercepted operation associated with the kernel module comprises an instruction to disable, modify, or mitigate the integrity verification agent.

3. The method of claim 1, wherein the secure world virtual processor is separated and protected from the normal world virtual processor.

4. The method of claim 1, wherein data and code of the secure world virtual processor is inaccessible by the normal world virtual processor.

5. The method of claim 1, wherein data and a code of the normal world virtual processor is accessible by the secure world virtual processor.

6. The method of claim 1, wherein instantiating of the normal world virtual processor comprises:
   generating a virtual memory map of the normal world virtual processor; and
   defining memory access protection of privileged code pages within the virtual memory map as non-writeable.

7. The method of claim 6, wherein the privileged code pages comprise an interrupt that processes a vector or exceptions that process the vector.

8. The method of claim 6, wherein the virtual memory map of the normal world virtual processor defines memory access such that an unprivileged code page is prevented from executing a security critical operation or a privileged instruction.

9. The method of claim 1, wherein intercepting the operation comprises switching an execution context from the normal world virtual processor to the secure world virtual processor, such that the operation is executed with the integrity verification agent in lieu of a normal world operating system.

10. The method of claim 1, wherein intercepting the operation comprises:
    modifying a normal world operating system of the normal world virtual processor; and
    intercepting attempts to write information into privileged code pages.

11. The method of claim 10, wherein modifying the normal world operating system of the normal world virtual processor comprises at least one of:
    modifying source code of the normal world operating system;
    modifying an executable binary of the normal world operating system; and
    converting a binary of the normal world operating system.

12. The method of claim 1, further comprising:
    performing a static integrity check of a normal world operating system of the normal world virtual processor.

13. The method of claim 1, further comprising:
    performing a mitigation action.

14. The method of claim 13, wherein the mitigation action comprises at least one of:
    rejecting execution of the intercepted operation;
    issuing a security alert; and
    shutting down the electronic device.

15. The method of claim 13, wherein the integrity verification agent intercepts the operation associated with the kernel module, when the integrity verification agent detects that the operation violates a security policy.

16. An electronic device for performing integrity verification, comprising:
    a normal world virtual processor to execute a normal world operating system;
    a secure world virtual processor to:
      execute an integrity verification agent;
      intercept an operation attempted by the normal world virtual processor in which the operation is associated with a kernel module; and
      verify, using the integrity verification agent, the intercepted operation,
      wherein the secure world virtual processor is configured to:
        obtain a verification table for the kernel module;
        calculate a hash value of the kernel module; and
        compare the calculated hash value of the kernel module wilt a corresponding hash value stored in the verification tablet;
      load the kernel module when the calculated hash value of the kernel module is identical to the corresponding hash value stored in the verification table.

17. A non-transitory computer-readable medium which upon execution instructs at least one processor to:
    instantiate a normal world virtual processor and a secure world virtual processor for an electronic device;
    execute an integrity verification agent within a domain of the secure world virtual processor;
    intercept, by the secure world virtual processor, an operation attempted by the normal world virtual processor in which the operation is associated with a kernel module; and
    verity, by the integrity verification agent, the intercepted operation,
    wherein the at least one processor is configured to:
      obtain a verification table for the kernel module;
      calculate a hash value of the kernel module; and
      compare the calculated hash value of the kernel module with a corresponding hash value stored in the verification table, and
    load the kernel module when the calculated hash value of the kernel module is identical to the corresponding hash value stored in the verification table.

* * * * *